(12) United States Patent
Jones

(10) Patent No.: US 8,142,034 B1
(45) Date of Patent: Mar. 27, 2012

(54) LASER FILTER FOR RIFLE SCOPE

(75) Inventor: Peter W. J. Jones, Belmont, MA (US)

(73) Assignee: Tenebraex Corporation, Boston, MA (US)

( * ) Notice: Subject to any disclaimer, the term of this patent is extended or adjusted under 35 U.S.C. 154(b) by 0 days.

(21) Appl. No.: 11/439,336

(22) Filed: May 22, 2006

Related U.S. Application Data

(60) Provisional application No. 60/682,929, filed on May 20, 2005.

(51) Int. Cl.
*G02B 27/00* (2006.01)
(52) U.S. Cl. ............... 359/614; 42/119; 42/129; 42/143
(58) Field of Classification Search .......................... None
See application file for complete search history.

(56) References Cited

U.S. PATENT DOCUMENTS

| | | | |
|---|---|---|---|
| 5,103,567 A | 4/1992 | Loving | |
| 5,150,528 A * | 9/1992 | Shire | 42/129 |
| 5,201,135 A * | 4/1993 | Cowles | 42/129 |
| 5,299,067 A | 3/1994 | Kutz et al. | |
| 5,745,292 A * | 4/1998 | Jones | 359/613 |
| 6,480,339 B2 | 11/2002 | Clark | |
| 6,604,316 B1 | 8/2003 | Custer | |
| 6,937,819 B2 | 8/2005 | Brough | |
| 7,051,469 B1 * | 5/2006 | Pochapsky et al. | 42/111 |

* cited by examiner

*Primary Examiner* — Arnel C Lavarias
(74) *Attorney, Agent, or Firm* — Ropes & Gray LLP

(57) ABSTRACT

The systems, methods, and devices include a filter unit for removably engaging with a rifle scope. The filter unit includes a cylindrical body having a proximal end and a distal end, with the proximal end adapted for removably engaging with the rifle scope, and a laser filter positioned within the cylindrical body to filter light passing into the rifle scope. A resilient band may be used to hold the filter unit to the rifle scope.

33 Claims, 6 Drawing Sheets

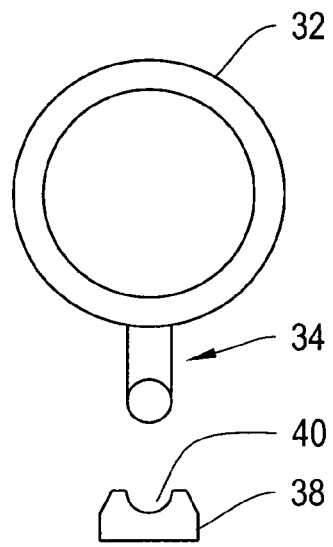 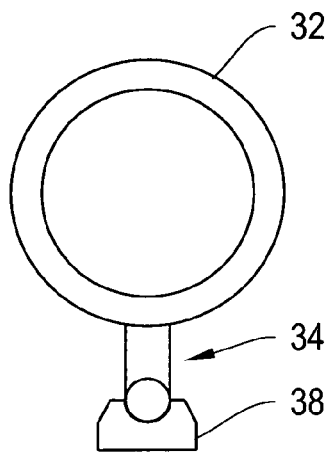
Fig. 5A  Fig. 5B
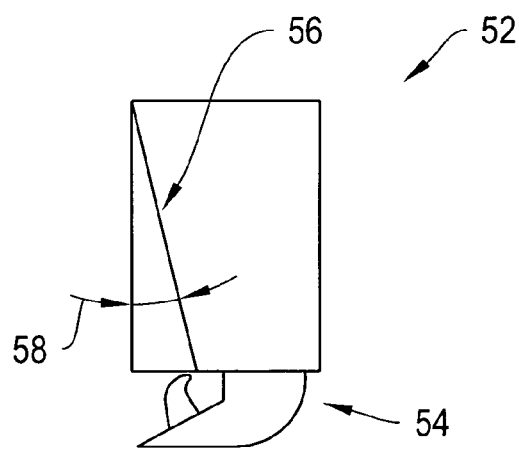
Fig. 6

LASER FILTER FOR RIFLE SCOPE

REFERENCE TO RELATED APPLICATIONS

This Application claims the benefit of U.S. Provisional Application Ser. No. 60/682,929 filed on May 20, 2005. The teachings of the foregoing application are hereby incorporated by reference herein in their entirety.

BACKGROUND OF THE INVENTION

The advances in laser technology have resulted in a wide availability of inexpensive but powerful lasers, which are commonly used in the military. These lasers may cause blinding, and are particularly dangerous to infantry and pilots. The danger is both from lasers used by an enemy (threat lasers) and from powerful lasers used for other purposes on the battlefield such as rangefinding or target designation (hazard lasers). Modern infantry are particularly vulnerable as they take aim at enemy combatants through magnified telescopic instruments. This makes their retina susceptible to damage from a threat and hazard lasers.

Accordingly, there is a need for simple and easy to use devices that can attach laser filters to common optics used by infantry.

SUMMARY

The invention addresses the deficiencies of the prior art by providing a laser filter for engaging with a rifle scope. In one aspect, the invention provides a filter unit for removably engaging with a rifle scope. The filter unit includes a cylindrical body having a proximal end and a distal end, wherein the proximal end is adapted for removably engaging with the rifle scope, and a laser filter positioned within the cylindrical body to filter light passing into the rifle scope. According to one feature, the filter unit includes a resilient band for holding the cylindrical body to the rifle scope. The resilient band may be constructed of a neoprene material, such as an o-ring, or it may be constructed of any suitable material. In some embodiments, the resilient band may be a Buna o-ring, a looped o-ring, any other suitable type of rubber o-ring, a zip-tie, cable tie, strap, bungee cord, or any other suitable attachment band.

In one embodiment, the filter unit includes a second component having an anti-reflective function. In a preferred embodiment, the second component is attached to the distal end of the cylindrical body of the filter unit. In one embodiment, the distal end of the cylindrical body is externally threaded, and the proximal end of the second component is internally threaded. The second component may then be threaded onto the cylindrical body.

According to one configuration, the filter unit includes a foot, which extends radially from the cylindrical body. The foot may interfit with a groove on the rifle scope. In one embodiment, the rifle scope includes a grooved base portion, extending out past the end of the scope, and the foot interfits with the groove in the grooved base portion. The foot may include a radially extending portion, extending at an angle to the cylindrical body, and a second distally extending portion, extending parallel to the cylindrical body. In one configuration, the foot also includes a mechanical stop, which projects upward from the second portion of the foot back toward the cylindrical body.

According to one approach, for installation of the filter unit, the foot hooks onto the resilient band. The filter unit is then pulled forward such that the foot enters a groove on the rifle scope. The resilient band pulls the filter unit back against a front lens mounting ring inside the scope. According to this approach, the resilient band is a stretchable resilient band. The tension of the resilient band is low enough to allow for easy installation, yet high enough to secure the filter unit to the scope during recoil of the rifle from firing a shot. The filter unit may be displaced slightly away from the scope by the recoil, but the tension of the resilient band reseats the filter unit against the front lens mounting ring of the scope.

The laser filter is positioned within the cylindrical body of the filter unit. In one embodiment, the laser filter is oriented at an angle within the cylindrical body. The laser filter may be positioned at about a four degree angle. According to other embodiments, the laser filter may be positioned at an angle that is less than four degrees, or at an angle that is greater than four degrees. In one possible embodiment, the laser filter may not be positioned at an angle, but may positioned upright within the cylindrical body.

In another aspect, the invention provides a rifle scope including a telescopic sight, a filter unit engaged with the telescopic sight, and a resilient band for holding the filter unit to the telescopic sight. The filter unit includes a laser filter to filter light passing into the telescopic sight. According to one feature, the resilient band holds the filter unit to the telescopic sight against the recoil pressure which results when the rifle is shot.

BRIEF DESCRIPTION OF THE FIGURES

The foregoing and other objects and advantages of the invention will be appreciated more fully from the following further description thereof, with reference to the accompanying drawings.

FIGS. 5A-5B depict a front view of a filter unit and a radially extending foot.

FIG. 6 depicts a side view of a filter unit including a laser filter.

DETAILED DESCRIPTION OF THE FIGURES

The following is a description of certain illustrated embodiments. However, these embodiments are only examples of the laser filters of the invention, and are not used or understood as limiting the scope of the invention. FIGS. 1 through 7B depict a removable filter that can be quickly engaged to the forward portion of a rifle scope using a resilient band.

Figure 1:
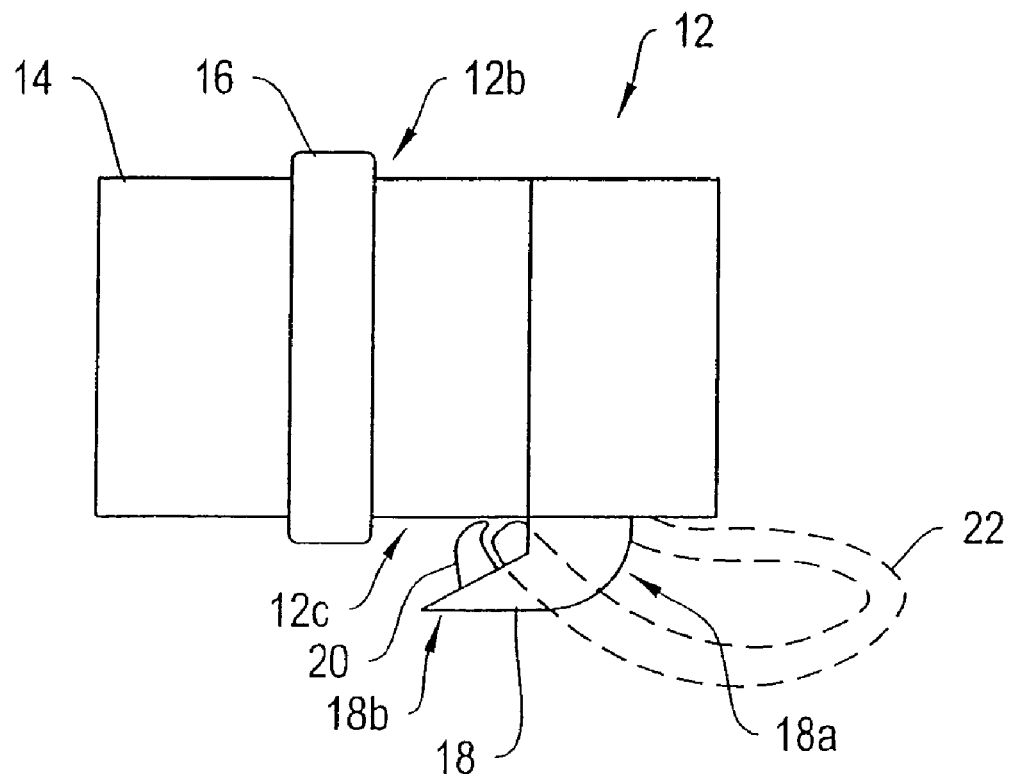
FIG. 1 depicts a side view of a filter unit and attached anti-reflective component.
Figure 2A:
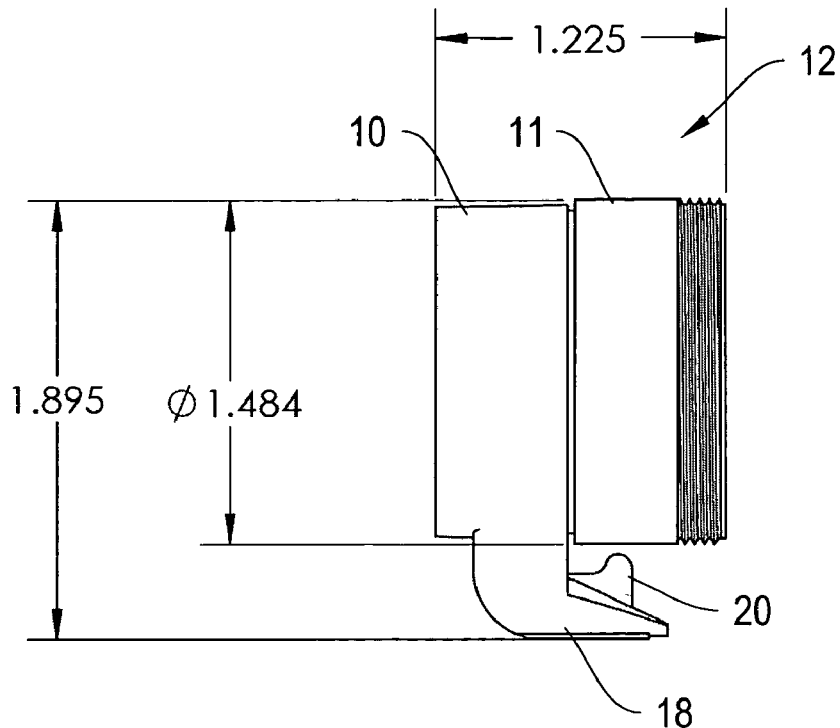
FIGS. 2A-2B depict a side view and a front view, respectively, of the filter unit, including exemplary dimensions.
Figure 2B:
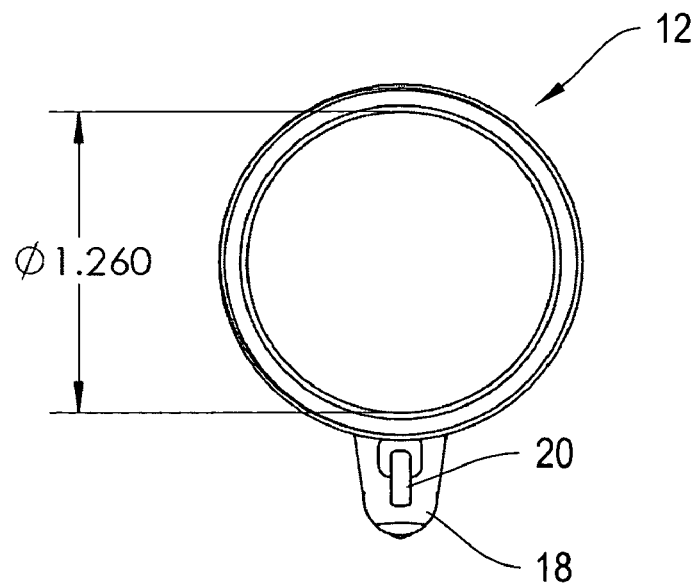

FIG. 1 depicts a side view of a filter unit 12 and an attached anti-reflective component 14. The filter unit 12 is cylindrical, and may be any suitable size for engaging with a rifle scope. In a preferred embodiment, as shown in FIG. 2A, the filter unit 12 has an outer diameter of about 1.484 inches and engages with the distal end of a rifle scope. According to one embodiment, the filter unit 12 is sized and shaped for interfitting with an ACOG rifle scope. In other embodiments, the filter unit 12 may have a diameter of about 0.5 inches, about 1.5 inches, about 2 inches, about 2.5 inches, about 3.5 inches, or greater than about 3.5 inches. As shown in FIG. 2B, the interior diameter of the filter unit may have a diameter of about 1.26 inches. In other embodiments, the interior diameter may be about 1 inch, about 1.5 inches, about 2 inches, or more than about 2 inches. The laser filter that is positioned within the filter unit may have a diameter of about 1 inch, about 1.25 inches, about 1.5 inches, about 2 inches, or more than about 2 inches. In a preferred embodiment, the length of the filter unit 12 is about 1.225 inches. In other embodiments, the length of the filter unit 12 may be about 1 inch, about 2 inches, about 3 inches, or more than about 3 inches.

The filter unit 12 may be constructed of any suitable material. In a preferred embodiment, the filter unit 12 is constructed of aluminum. Alternatively, the filter unit 12 may be constructed of stainless steel, or plastic, such as glass filled ABS (Acrylonitrile Butadiene Styrene) plastic or thermoplastic. As shown more particularly in FIG. 2A, the filter unit 12 may comprise two separate pieces 10 and 11. The proximal piece 10 may be connected to a foot 18. The distal piece 11 may include the laser filter. According to various embodiments, the proximal piece 10 and the distal piece 11 may be constructed of the same material, or they may be constructed of different materials. In one embodiment, the proximal piece 10 is constructed of a plastic material, and the distal piece 11 is constructed of an aluminum material.

According to the illustrative embodiment, the filter unit 12 includes a foot 18. The foot 18 includes a first portion 18a extending radially downward from the bottom side 12c of the filter unit 12, and a second portion 18b extending distally from the end of the first portion 18a in a plane that is substantially parallel to the axis of the filter unit 12. According to one embodiment, the foot 18 also includes a mechanical stop 20, extending from the distal end of the second portion 18b of the foot 18 back upwards toward the filter unit 12. In one embodiment, the foot 18 and the mechanical stop 20 form a closed loop, with the distal end of the mechanical stop abutting or attaching to the bottom side 12c of the filter unit 12. As shown in FIG. 2A, the foot 18 may radially extend about 0.411 inches from the diameter of the outer surface of the filter unit 12. According to other embodiments, the foot 18 may extend about 0.25 inches, about 0.5 inches, about 1 inch, about 1.5 inches, or about 2 inches. The foot 18 may be constructed of any suitable material, such as those listed above for construction of the filter unit 12.

As shown in FIG. 1, a resilient band 22 may be attached to the foot 18 of the filter unit 12. According to a preferred embodiment, the resilient band 22 is stretchable and is constructed of a neoprene material. Neoprene is resistant to common chemicals and ozone. According to other embodiments, the resilient band 22 may be a Buna o-ring, a looped o-ring, any other suitable type of rubber o-ring, or may be constructed of any other suitable material. The band 22 may be a strap, a zip-tie, a cable-tie, and adjustable leash, a bungee cord, or any other suitable band. The distal end of the resilient band 22 may be looped around the foot 18, while the proximal end of the resilient band 22 may hook over a selected part of a rifle scope, securing the filter unit 12 to the rifle scope. The proximal end of the resilient band loops around the base a rifle scope, holding the filter unit 12 to the rifle scope against recoil pressure that would tend to remove the filter from the rifle scope. According to one feature, the foot 18, with the resilient band looped around it, acts as a lever, helping to keep the filter unit 12 in place.

Figure 3A:
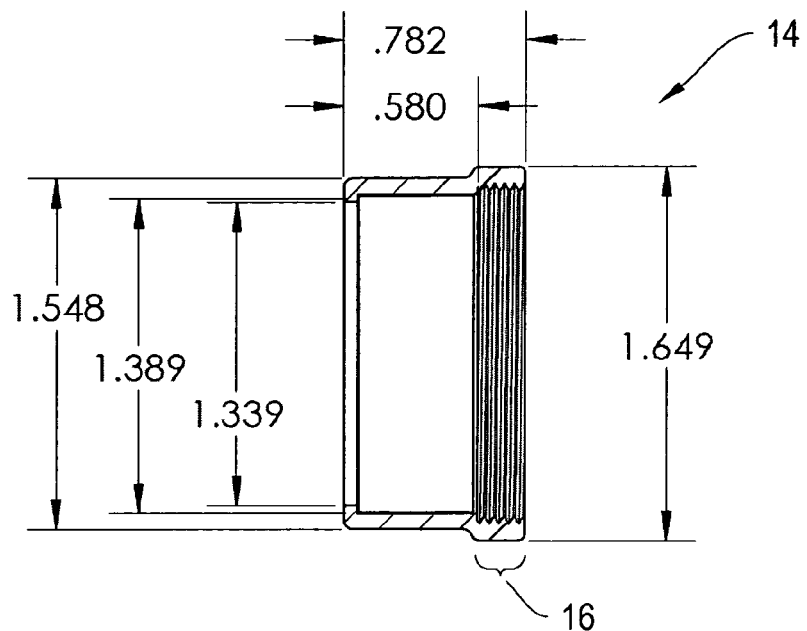
FIGS. 3A-3B depict a side view and a front view, respectively, of an anti-reflective component, including exemplary dimensions.
Figure 3B:
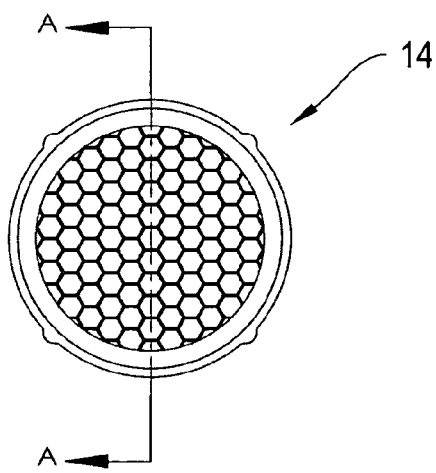

According to one implementation, as shown in FIGS. 3A and 3B, the antireflective component 14 comprises a honeycomb shield, which maintains a clear, bright view through the scope, but prevents light aimed at the scope from reflecting from the outer glass or lens piece. This may help prevent detection of the scope (and the user) by an enemy. According to the illustrative embodiment, the anti-reflective component 14 includes a proximal increased diameter portion 16. According to one feature the increased diameter portion 16 interfits over the distal end 12b of the filter unit 12. In one embodiment, as shown in greater detail with respect to FIGS. 2A, 3A, and 4, the increased diameter portion 16 has a threaded internal surface, the distal end 12b of the filter unit 12 is externally threaded, and the anti-reflective component 14 is screwably attachable to the filter unit 12.

As shown in the illustrative embodiment, the antireflective component may have an outer diameter of about 1.548 inches, with an inner diameter of about 1.389 inches. In other embodiments, the antireflective component may have an outer diameter of about 1 inch, about 1.5 inches, about 2 inches, about 3 inches, or more than about 3 inches, and an inner diameter of about 0.5 inches, about 1 inch, about 1.5 inches, about 2 inches, about 3 inches, or more than about 3 inches. The honeycomb shield may have a diameter of about 1.339 inches. In other embodiments, the honeycomb shield may have a diameter of about 0.5 inches, about 1 inch, about 1.5 inches about 2 inches, about 3 inches, or more than about 3 inches. The increased diameter portion 16 may have an outer diameter of about 1.649 inches. In other embodiments, the increased diameter portion 16 may have an outer diameter of about 1 inch, about 1.5 inches, about 2 inches, about 3 inches, or more than about 3 inches.

Figure 4:
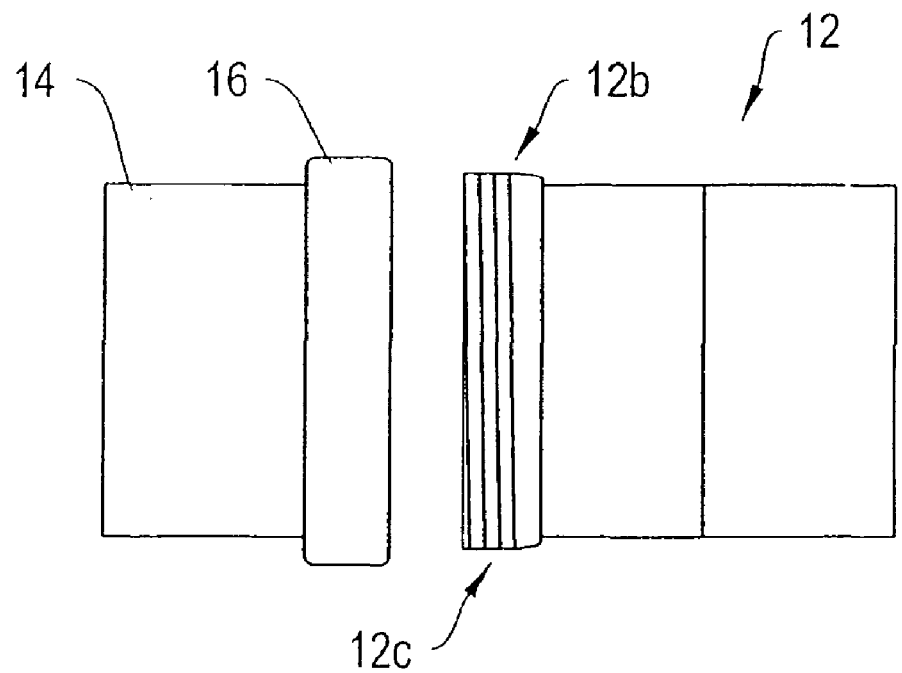
FIG. 4 depicts a top view of a filter unit and a detached anti-reflective component.

FIG. 4 depicts a side view of the filter unit 12 with the anti-reflective component 14 detached. As shown in the figure, the distal end 12b of the filter unit 12 has a threaded external surface. As discussed above, the increased diameter portion 16 of the anti-reflective component 14 may have a threaded internal surface. The threads may be used to screw the anti-reflective component 14 to the filter unit 12. In other embodiments, the filter unit 12 may have an internal threaded surface and the antireflective component 14 may have an external threaded surface.

FIGS. 5A-5B depict a front view of a filter 32, a radially extending foot 34, and a grooved portion 38, which extends distally from the base of a rifle scope. According to one embodiment, when the filter 32 engages with the scope of a rifle, the foot 34 interfits with the grooved portion 38. FIG. 5A shows the filter 32 and foot 34 before the filter 32 engages with the rifle scope. FIG. 5B shows the filter 32 and the foot 34 after the filter 32 is engaged with the rifle scope, and the foot 34 is interfitted with the grooved portion 38.

The grooved portion 38 includes a groove 40. According to one embodiment, the foot 34 is sized and shaped for interfitting with the groove 40 when the filter 32 is engaged with the end of the rifle scope. According to the illustrative embodiment, a cross-section of the groove 40 is semi-circular, and the bottom of the foot 34 is rounded. According to alternative embodiments, the cross-section of the groove 40 may be any suitable shape, including v-shaped, polygonal, and semi-ellipsoidal, and the foot 34 may be sized and shaped accordingly for interfitting with the groove 40. According to one feature, as the groove 40 extends back proximally, it becomes more enclosed, and may be a fully enclosed aperture at the proximal end of the scope.

FIG. 6 depicts a cross-sectional side view of a filter unit 52 including a foot 54, and a laser filter 56. The laser filter 56 is disposed within the filter unit 52, and filters light passing through the filter unit 52. According to one feature, the laser filter 56 is positioned at an angle 58 with respect to a vertical cross section (as shown in FIGS. 5A and 5B) of the filter unit 52, and is not parallel with the optical path. Thus, when the filter unit 52 is engaged with the rifle scope, the laser filter 56 will not be parallel with the lens of the rifle scope. According to a preferred embodiment, the angle 58 is about 4 degrees. However, according to alternative embodiments, the angle 58 may be about 0.5 degrees, about 1 degree, about 2 degrees, about 3 degrees, about 5 degrees, about 7 degrees, about 10 degrees, or more than about 10 degrees. The angle 58 may also be less than 0.5 degrees.

According to one implementation, the laser filter 56 will always be oriented at the same rotational angle within the filter 52. For example, the most distal point on the circumference of the laser filter 56 may always be oriented at the top-most point of the inner surface of the filter 52, with the most proximal point on the circumference of the laser filter 56 oriented at the bottom-most point of the inner surface of the filter 52. According to various embodiments, the laser filter 56 may be a glass disk. According to other embodiments, the laser filter 56 may be constructed of any suitable material, including, for example, plastic. Because the surface of the laser filter 56 is not perfectly parallel with the lens of the rifle scope, the laser filter 56 may act as an optical wedge, shifting the image in the rifle scope, and thus a bullet's point of impact. Thus, in a preferred embodiment, each time the filter 52 is engaged with the rifle scope, the laser filter 56 is in the same rotational position so that a shooter can correctly anticipate and compensate for the shift in the bullet's point of impact. According to one feature, coupling of the foot 54 to a grooved portion of the rifle scope (as shown in FIGS. 5A and 5B) maintains the consistency of the orientation of the laser filter with respect to the rifle scope from use to use, resulting in a consistent shift in the image seen through the rifle scope.

The laser filter may be any suitable type of optical filter or combination of filter materials that blocks or attenuates selected laser light, including, for example, a rejection band filter, an absorptive filter, or a reflective filter.

Figure 7A:
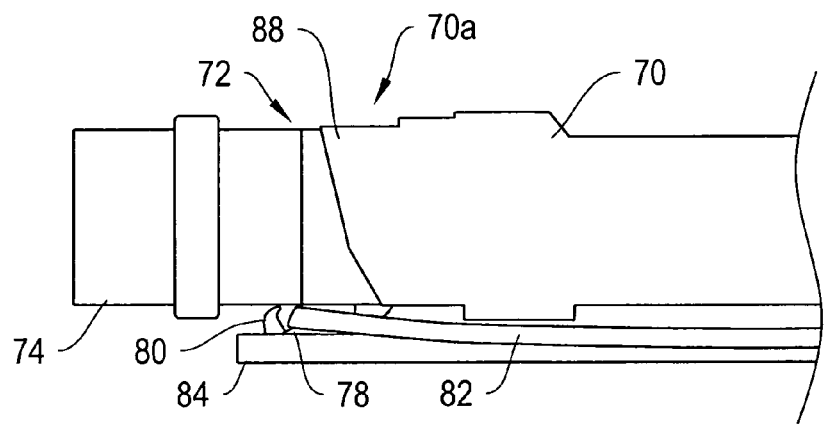
FIG. 7A depicts a side view of a filter unit and attached anti-reflective component engaged with the distal end of a rifle scope.

FIG. 7A depicts a side view of a filter 72 and attached anti-reflective component 74 engaged with the distal end 70a of a rifle scope 70. As shown in the illustrative embodiment, the distal end 70a of the rifle scope includes a "hood" 88, extending past the distal-most lens or retaining ring of the scope 70. The filter 72 is mounted under the hood 88, abutting the distal-most lens of the scope 70. According to one feature, the foot 78 of the filter 72 interfits with a groove in the grooved portion 84 at the base of the scope 70, as shown in FIGS. 3A and 3B. The resilient band 82 is looped around the foot 78, and holds the filter 72 in place abutted against the end of the scope 70 with recoil pressure.

Figure 7B:
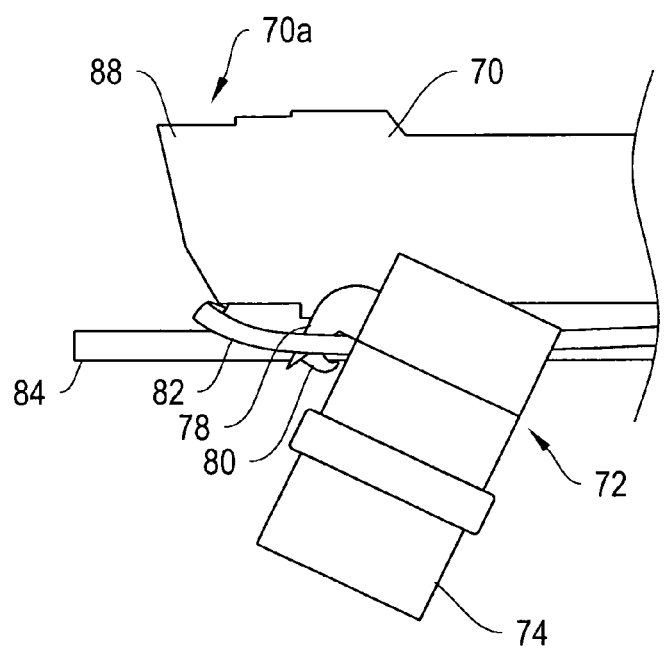
FIG. 7B depicts a side view of a filter unit and attached anti-reflective component disengaged from the end of the rifle scope, but fastened to the rifle scope with a resilient band.

FIG. 7B depicts a side view of the filter 72 and attached anti-reflective component 74 disengaged from the end 70a of the rifle scope 70, but fastened to the rifle scope 70 with a resilient band 82. According to one implementation, to disengage the filter 72 from the scope 70, the filter 72 may be pulled away from the scope, stretching the resilient band 82. The filter 72 may then be pulled around the side of the scope 70 while maintaining the connections between the foot 78 and the resilient band 82. As shown in the illustrative embodiment, the filter 72 dangles from the side of the scope. The foot 78 and mechanical stop 80 hook over the resilient band 82, preventing the filter 72 from easily detaching from the scope 70 and being lost.

The filter described herein for filtering out laser light may be applied to a rifle scope, or to any suitable device, including, for example, binoculars, monoculars, visors, magnifying visors, telescopes, goggles, night-vision systems and devices, weapon sights, and spotting scopes.

Accordingly, described herein is a filter that readily retrofits existing rifle scopes and provides for effective protection against threat or hazard lasers that may blind or harm the vision of a soldier. Further disclosed are methods for retrofitting a scope with filters and devices for avoiding detection of the scope by a laser interrogation device.

What is claimed is:

1. A filter unit for removably engaging with a rifle scope, comprising:
    a cylindrical body having a proximal end and a distal end, wherein the proximal end is adapted for removably engaging with the rifle scope;
    a laser filter positioned within the cylindrical body to filter light passing into the rifle scope,
    a resilient band for holding the cylindrical body to the rifle scope; and
    a foot, wherein the foot extends radially from the cylindrical body and interfits with the rifle scope to optically align the laser filter with the rifle scope;
    wherein the resilient band removably fastens the rifle scope to the cylindrical body by looping around a portion of the rifle scope and a portion of the cylindrical body to substantially secure the proximal end of the cylindrical body to the rifle scope.

2. The filter unit of claim 1, wherein the resilient band is constructed of a neoprene material.

3. The filter unit of claim 1, wherein the resilient band is a resilient o-ring.

4. The filter unit of claim 1, wherein the distal end of the cylindrical body is externally threaded.

5. The filter unit of claim 1, further comprising a second component having an anti-reflective function.

6. The filter unit of claim 5, wherein a proximal end of the second component is internally threaded.

7. The filter unit of claim 5, wherein the second component is screwed onto the cylindrical body.

8. The filter unit of claim 5, wherein the second component attaches to the distal end of the cylindrical body.

9. The filter unit of claim 5, wherein a proximal end of the second component is externally threaded.

10. The filter unit of claim 1, wherein the foot interfits with a groove on the rifle scope.

11. The filter unit of claim 1, wherein the foot further comprises a mechanical stop.

12. The filter unit of claim 1, wherein the laser filter is oriented at an angle within the cylindrical body.

13. The filter unit of claim 12, wherein the angle is four degrees.

14. The rifle scope of claim 1, wherein the rifle scope includes a groove and the foot slides within the groove to optically align the laser filter to the rifle scope along the groove.

15. The rifle scope of claim 1, wherein the resilient band loops around a portion of the rifle scope and the foot to secure the proximal end of the cylindrical body to the rifle scope.

16. The rifle scope of claim 1, wherein the rifle scope includes a recess and the proximal end of the cylindrical body slides into the recess, and wherein the resilient band fastens the cylindrical body to the rifle scope within the recess.

17. The rifle scope of claim 1, wherein the foot extends radially from near the proximal end of the cylindrical body.

18. The filter unit of claim 1, wherein the foot rotationally aligns the cylindrical body with the rifle scope such that the laser filter is in a substantially same rotational position with respect to the rifle scope each time the cylindrical body is fastened to the rifle scope.

19. The filter unit of claim 1, wherein the resilient band holds the cylindrical body, including the laser filter, to the rifle scope with a tension sufficient to secure the cylindrical body to the rifle scope upon recoil.

20. The filter unit of claim 1, wherein the distal end of the cylindrical body is internally threaded.

21. The filter unit of claim 1, wherein the portion of the cylindrical body comprises the foot, and wherein the resilient band removably fastens the rifle scope to the cylindrical body by looping around a portion of the rifle scope and the foot.

22. A rifle scope, comprising:
   a telescopic sight;
   a filter unit, engaged with the telescopic sight, wherein the filter unit comprises a laser filter to filter light passing into the telescopic sight;
   a resilient band for holding the filter unit to the telescopic sight with a tension sufficient to substantially secure the filter unit to the telescopic sight upon recoil; and
   a foot, wherein the foot extends radially from an outer surface of the filter unit and interfits with the telescopic sight;
   wherein the resilient band removably fastens the telescopic sight to the filter unit by looping around a portion of the telescopic sight and a portion of the filter unit to substantially secure the proximal end of the filter unit to the telescopic sight.

23. The rifle scope of claim 22, wherein the resilient band is constructed of a neoprene material.

24. The rifle scope of claim 22, further comprising a second component having an anti-reflective component.

25. The rifle scope of claim 22, wherein the foot interfits with a groove on the rifle scope.

26. The rifle scope of claim 22, wherein the foot further comprises a mechanical stop.

27. The rifle scope of claim 26, wherein the foot and the mechanical stop form a substantially closed loop with a distal end of the mechanical stop substantially abutting a bottom portion of the cylindrical body.

28. The rifle scope of claim 27, wherein the resilient band passes through the substantially closed loop.

29. The rifle scope of claim 22, wherein the laser filter is oriented at an angle within the filter unit.

30. The filter unit of claim 22, wherein the foot rotationally aligns the filter unit with the rifle scope such that the laser filter is in a substantially same rotational position with respect to the rifle scope each time the filter unit is fastened to the rifle scope.

31. The rifle scope of claim 22, wherein the portion of the filter unit comprises the foot, and wherein the resilient band removably fastens the telescopic sight to the filter unit by looping around a portion of the telescopic sight and the foot.

32. A rifle scope, comprising
   a scope body having a proximal end and a distal end; and
   a laser filter unit removably engaged with the scope body, including
      a cylindrical body having a proximal end and a distal end, such that the proximal end removably engages with the scope body,
      a laser filter disposed within the cylindrical body to filter light passing into the rifle scope;
      a resilient band having a proximal end and a distal end, such that the distal end of the resilient band is connected to a portion of the cylindrical body and the proximal end of the resilient band is connected to the scope body, and
      a foot extending radially from the cylindrical body, to optically align the laser filter unit with the scope body;
   wherein the resilient band removably fastens the scope body to the laser filter unit with a tension sufficient to substantially secure the laser filter unit to the scope body upon recoil.

33. The rifle scope of claim 32, wherein the portion of the cylindrical body comprises the foot, and wherein the distal end of the resilient band is connected to the foot.

\* \* \* \* \*